United States Patent
Omura (10) Patent No.: US 9,553,529 B2
(45) Date of Patent: Jan. 24, 2017

(54) MOTOR CONTROLLER

(71) Applicant: ASMO CO., LTD., Kosai, Shizuoka-pref. (JP)

(72) Inventor: Takehide Omura, Hamamatsu (JP)

(73) Assignee: ASMO CO. LTD., Kosai (JP)

( * ) Notice: Subject to any disclaimer, the term of this patent is extended or adjusted under 35 U.S.C. 154(b) by 0 days.

(21) Appl. No.: 14/641,442

(22) Filed: Mar. 9, 2015

(65) Prior Publication Data

US 2015/0263649 A1  Sep. 17, 2015

(30) Foreign Application Priority Data

Mar. 17, 2014 (JP) .................................. 2014-054149

(51) Int. Cl.
*H02P 23/00* (2016.01)
*H02P 6/08* (2016.01)

(52) U.S. Cl.
CPC .............. *H02P 6/085* (2013.01); *H02P 29/68* (2016.02)

(58) Field of Classification Search
CPC . Y02T 10/642; Y02T 10/7005; B62D 5/0463; H02P 27/08
USPC ........ 318/432, 599, 811, 471; 388/800, 811, 388/819, 821, 934
See application file for complete search history.

(56) References Cited

U.S. PATENT DOCUMENTS

| | | | |
|---|---|---|---|
| 6,802,185 B2 * | 10/2004 | Furukawa .......... | B60H 1/00828 123/41.12 |
| 6,864,653 B2 * | 3/2005 | Heydt ................ | F04D 25/0613 318/268 |
| 7,038,415 B2 * | 5/2006 | Nakamura ......... | B60H 1/00828 318/432 |
| 7,183,737 B2 * | 2/2007 | Kitagawa .................. | H02P 7/28 318/599 |
| 7,301,294 B2 * | 11/2007 | Ogino ..................... | H02P 6/165 318/400.03 |
| 7,551,411 B2 * | 6/2009 | Woods .................. | B24B 23/028 318/434 |
| 8,159,162 B2 * | 4/2012 | Kanamori ................. | H02P 6/20 318/400.11 |
| 8,278,859 B2 * | 10/2012 | Sakai ...................... | H02P 23/22 318/400.32 |
| 2007/0098374 A1 * | 5/2007 | Fujiwara ................. | G06F 1/203 388/811 |

(Continued)

FOREIGN PATENT DOCUMENTS

JP  2009-278802 A  11/2009

*Primary Examiner* — Rina Duda
(74) *Attorney, Agent, or Firm* — SOLARIS Intellectual Property Group, PLLC (57) ABSTRACT

There is provided a motor controller including: a voltage generator that generates a voltage applied to a motor; a temperature detector that detects a temperature of a circuit; a rotation speed detector that detects a rotation speed of the motor; and a voltage controller that controls the voltage generator so as to generate a voltage of a duty ratio based on a speed instruction value, and that, in cases in which a temperature of an element configuring the circuit, computed based on the temperature of the circuit detected by the temperature detector, the rotation speed of the motor detected by the rotation speed detector, and a load of the circuit, reaches a predetermined threshold value or above, controls the voltage generator so as to generate a voltage of a duty ratio that is lower than the duty ratio based on the speed instruction value.

5 Claims, 9 Drawing Sheets

(56) References Cited

U.S. PATENT DOCUMENTS

2008/0072619 A1\* 3/2008 Nojima ................ F25B 49/025
  62/498
2009/0024252 A1\* 1/2009 Aridome ................ B60K 6/445
  700/275

\* cited by examiner

| POWER SOURCE VOLTAGE (V) | TEMPERATURE (°C) | | |
|---|---|---|---|
| | ELEMENT 1 | ELEMENT 2 | THERMISTOR |
| 9 | 150 | 120 | 110 |
| 10 | 140 | 130 | 120 |
| 12 | 130 | 140 | 130 |
| 14 | 110 | 145 | 140 |
| 16 | 90 | 150 | 145 |

FIG.9

| POWER SOURCE VOLTAGE (V) | TEMPERATURE COEFFICIENT | |
|---|---|---|
| | ELEMENT 1 | ELEMENT 2 |
| 9 | 1.154 | 0.857 |
| 10 | 1.077 | 0.929 |
| 12 | 1.000 | 1.000 |
| 14 | 0.846 | 1.036 |
| 16 | 0.692 | 1.071 |

FIG.10

MOTOR CONTROLLER

CROSS-REFERENCE TO RELATED APPLICATION

This application claims priority under 35 USC 119 from Japanese Patent Application, No. 2014-054149 filed Mar. 17, 2014, the disclosure of which is incorporated by reference herein.

BACKGROUND

Technical Field

The present disclosure relates to a motor controller.

Related Art

Semiconductors such as Field Effect Transistors (FETs), acting as switching elements, are mounted to inverter circuits that perform drive control of a motor. There is a risk of damage when the semiconductors such as FETs reach a specific temperature, or above.

In general, a thermistor, with a resistance value that varies according to temperature variation of a circuit board, is mounted on the circuit board to which the inverter circuit is mounted, and the temperature of the circuit board is detected from variations in the resistance value of the thermistor. In cases in which the temperature based on the detection result of the thermistor has reached a specific threshold value or above, a duty ratio of voltage applied to the motor is reduced, and the temperature increase of the switching elements is suppressed.

However, depending on the design of the circuit, the thermistor cannot necessarily be mounted in the vicinity of the switching elements of the inverter circuit. In cases in which the thermistor is mounted at a location a distance away from the switching elements, a correlation relationship between the temperature of the circuit board computed from the detection result of the thermistor, and the temperature of the switching elements needs to be derived. Further, the temperature threshold value, this being a determination criterion for lowering the load on the switching elements, is set low, such that the switching elements can be reliably protected.

However, there has been an issue in that, when reliability of protection of the switching elements is prioritized, the temperature threshold value is set low, such that the voltage applied to the motor is reduced more frequently, and it is difficult to stably rotate the motor at high output.

Japanese Patent Application Laid-Open (JP-A) No. 2009-278802 describes an techniques of a motor drive circuit in which the temperature of switching elements is detected based on a detected current value and a detected voltage value.

SUMMARY

However, there has been an issue in that, although the motor drive circuit described in JP-A No. 2009-278802 computes the temperature of switching elements such as FETs, the temperatures of other elements, such as a choke coil and coils of a stator of the motor, are not computed. Configuration elements of the circuit relating to control of the motor, and the motor are broadly divided into elements that overheat when the voltage of the power source is high, such the FETs of the inverter circuit previously described, and elements that overheat when the current of the power source is high, such as the choke coil and the coils of the stator of the motor. In the motor drive circuit described in JP-A No. 2009-278802, there has been an issue that, although the temperatures of the switching elements are computed, the temperatures of other elements such as the choke coil are not computed, namely, control that takes the temperatures of the other elements such as the choke coil into consideration is not performed.

In consideration of the above circumstances, an object of the present disclosure is to provide a motor controller that detects a risk of elements configuring a circuit overheating, and suppresses overheating of the elements.

In order to resolve the above issue, a first aspect of the present disclosure includes: a voltage generator that generates a voltage applied to a motor; a temperature detector that detects a temperature of a circuit including the voltage generator; a rotation speed detector that detects a rotation speed of the motor; and a voltage controller that controls the voltage generator so as to generate a voltage of a duty ratio based on a speed instruction value corresponding to operation of a switch for switching the rotation speed of the motor, and that, in cases in which a temperature of an element configuring the circuit, computed based on the temperature of the circuit detected by the temperature detector, the rotation speed of the motor detected by the rotation speed detector, and a load of the circuit, reaches a specific threshold value or above, controls the voltage generator so as to generate a voltage of a duty ratio that is lower than the duty ratio based on the speed instruction value.

In this motor controller, the voltage controller, that controls so as to generate a voltage of a duty ratio based on the speed instruction value, computes the temperature of the element configuring the circuit based on the temperature of the circuit detected by the temperature detector, the rotation speed of the motor detected by the rotation speed detector, and the load of the circuit.

In cases in which the temperature of the element reaches a specific threshold value or above, the motor controller controls so as to generate a voltage of a duty ratio that is lower than the duty ratio based on the speed instruction value, thereby enabling a risk of the element configuring the circuit overheating to be detected, and enabling the element to be suppressed from overheating.

A second aspect of the present disclosure is the motor controller of the first aspect, wherein the voltage controller sets the load of the circuit based on the duty ratio in cases in which the temperature of the element is lower than the threshold value.

In this motor controller, the temperature of the element can be computed based on the duty ratio of the voltage generated by the voltage generator, thereby enabling a risk of the element configuring the circuit overheating to be detected from the computed temperature of the element, and enabling the element to be suppressed from overheating.

A third aspect of the present disclosure is the motor controller of the first aspect, further including a current detector that detects a current of the voltage generator, wherein the voltage controller sets the load of the circuit based on the current detected by the current detector.

In this motor controller, the temperature of the element can be computed based on the current of the voltage generator, thereby enabling a risk of the element configuring the circuit overheating to be detected from the computed temperature of the element, and enabling the element to be suppressed from overheating.

A fourth aspect of the present disclosure is the motor controller of any one of the first to the third aspect, further including a storage section that stores correction values for correcting the temperature of the circuit according to the rotation speed of the motor and the load of the circuit, wherein the voltage controller computes the temperature of the element by referring to the correction values stored in the storage section and corrects the temperature of the circuit according to the rotation speed of the motor and the load of the circuit.

In this motor controller, the temperature of the circuit detected by the temperature detector is corrected using a correction value set according to the rotation speed of the motor and the load of the circuit, and the temperature of the element is computed. This enables a risk of the element configuring the circuit overheating to be detected from the computed temperature of the element, enabling the element to be suppressed from overheating.

A fifth aspect of the present disclosure is the motor controller of the fourth aspect, wherein: the element includes a first element that has a high temperature when a current of a power source is high, and a second element that has a high temperature when a voltage of the power source is high; the storage section stores first correction values relating to the first element and second correction values relating to the second element that are respectively determined according to the rotation speed of the motor and the load of the circuit; and the voltage controller refers to the first and second correction values stored in the storage section and computes the temperature of the first element and the temperature of the second element by correcting the temperature of the circuit according to the rotation speed of the motor and the load of the circuit, and, in cases in which the temperature of the first element reaches a first temperature threshold value or above, or in cases in which the temperature of the second element reaches a second temperature threshold value or above, controls the voltage generator so as to generate a voltage of a duty ratio lower than the duty ratio based on the speed instruction value.

In this motor controller, employing a correction value that is predetermined according to characteristics of the element configuring the circuit enables a risk of the element overheating to be detected according to the characteristics of the element, thereby enabling the element to be suppressed from overheating.

A sixth aspect of the present disclosure is the motor controller of any one of the first to the fifth aspect, wherein the voltage controller corrects the computed temperature of the element according to the voltage of the power source.

In this motor controller, the temperature of the element can be more reliably computed by taking the voltage of the power source into consideration, thereby enabling a risk of the element overheating to be detected, and enabling the element to be suppressed from overheating.

BRIEF DESCRIPTION OF THE DRAWINGS

Exemplary embodiments of the present disclosure will be described in detail based on the following figures, wherein.

DETAILED DESCRIPTION

Figure 1:
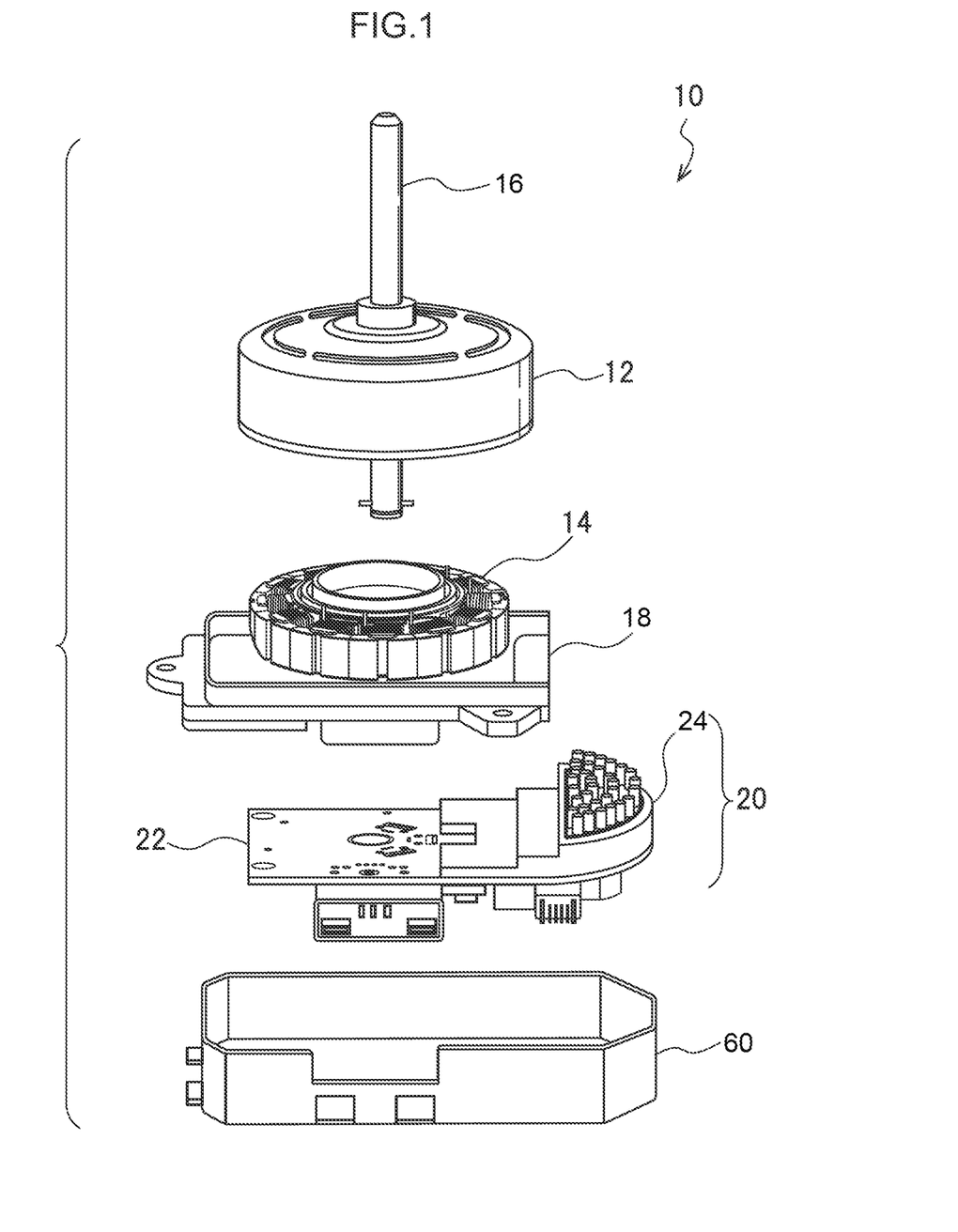
FIG. 1 is a schematic view illustrating a configuration of a motor unit employing a motor controller according to an exemplary embodiment of the present disclosure.

FIG. 1 is a schematic view illustrating a configuration of a motor unit 10 employing a motor controller 20 according to an exemplary embodiment. The motor unit 10 according to the exemplary embodiment in FIG. 1 is, as an example, what is referred to as a blower motor unit employed to convey air in an on-board air conditioner.

The motor unit 10 according to the present exemplary embodiment is a three phase motor with an outer rotor structure in which a rotor 12 is provided at the outside of a stator 14. The stator 14 is an electromagnet configured by a conductive wire wound around a core member, and is configured with three phases, namely a U phase, a V phase, and a W phase. The motor controller 20, described later, controls to switch the polarity of the magnetic field generated by the electromagnet, such that the U phase, the V phase, and the W phase of the stator 14 respectively generate what is known as a rotating magnetic field.

A rotor magnet (not illustrated in the drawings) is provided inside the rotor 12. The rotor magnet rotates the rotor 12 according to the rotating magnetic field generated by the stator 14. The rotor 12 is provided with a shaft 16 that rotates as a unit with the rotor 12. Although not illustrated in FIG. 1, in the present exemplary embodiment the shaft 16 is provided with a multi-bladed fan, for example what is known as a sirocco fan. The multi-bladed fan rotates together with the shaft 16, enabling air to be conveyed in the on-board air conditioner.

The stator 14 is attached to the motor controller 20 through an upper case 18. The motor controller 20 includes a circuit board 22 of the motor controller 20, and a heat sink 24 that dissipates heat generated by elements on the circuit board 22. A lower case 60 is attached to the motor unit 10 configured including the rotor 12, the stator 14, and the motor controller 20.

Figure 2:
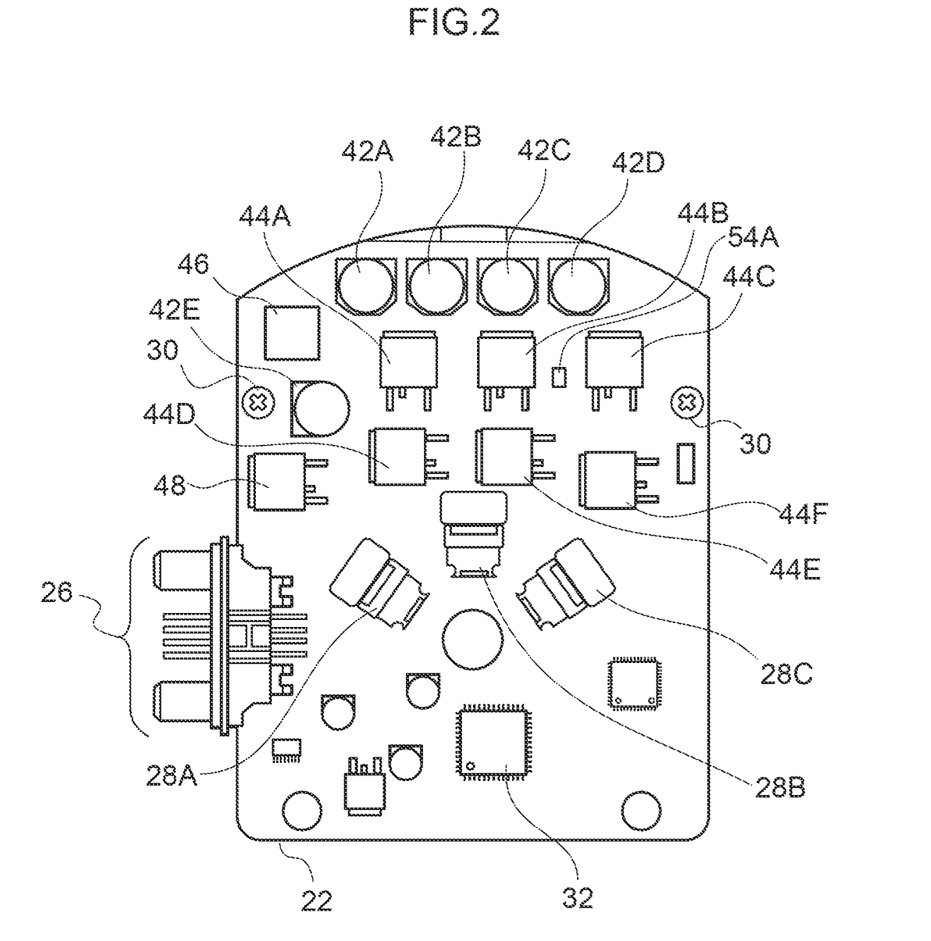
FIG. 2 illustrates an example of a circuit board of a motor controller according to an exemplary embodiment of the present disclosure.

Explanation follows regarding the circuit board of the motor controller according to the present exemplary embodiment, with reference to FIG. 2. FIG. 2 illustrates an example of the circuit board 22 of the motor controller 20 according to the present exemplary embodiment. In FIG. 2, an external connection connector 26 that is supplied with power from an on-board battery, and that is input with a control signal relating to the on-board air conditioner through a controller such as an Electronic Control Unit (ECU), is provided to the circuit board 22.

An inverter circuit 40 for controlling power supplied to the U phase, the V phase, and the W phase of the stator 14 is mounted to the circuit board 22. The inverter circuit 40 of the motor controller 20 according to the present exemplary embodiment is a voltage type inverter operating as a voltage source, and large capacity capacitors 42A, 42B, 42C, and 42D are connected, in parallel to one another, to the circuit at a direct current side of the inverter circuit 40.

Inverter FETs 44A, 44B, 44C, 44D, 44E, and 44F, acting as switching elements, are provided to the inverter circuit 40. The inverter FETs 44A, 44D, the inverter FETs 44B, 44E, and the inverter FETs 44C, 44F switch power supplied to the U phase, the V phase, and the W phase respectively. Power, controlled by the switching of the inverter FETs 44A to 44F, is supplied through power supply terminals 28A, 28B, 28C to the stator 14.

A choke coil 46 for removing noise, as well as a reverse connection prevention FET 48 and a large capacity capacitor 42E, are provided at the direct current side of the inverter circuit 40 on the circuit board 22. A microcomputer 32 for controlling the inverter circuit 40 is also mounted to the circuit board 22. The reverse connection prevention FET 48 is a FET that protects the inverter circuit 40 in cases in which the on-board battery is connected with the polarity reversed.

The inverter FETs 44A to 44F, the choke coil 46, and the reverse connection prevention FET 48 on the circuit board 22 illustrated in FIG. 2 generate significant heat during operation. In the present exemplary embodiment, the heat sink 24 is attached using fixing bolts 30 to a back side of the circuit board 22 at a location where elements generating significant heat during operation are mounted.

A thermistor 54A, this being a temperature sensor for sensing temperature relating to heat generated by the mounted circuit on the circuit board 22, is provided close to the inverter FET 44B. In the present exemplary embodiment, in cases in which there is a risk that the temperature of elements, computed based on the temperature of the thermistor 54A, has reached a predetermined threshold value or above, a duty ratio of a pulse output from the inverter circuit 40 is reduced so as to prevent damage to the elements due to the heat. Note that the thermistor 54A may be provided at a location other than a location close to the inverter FET 44B as long as the thermistor 54A is capable of detecting temperature relating to heat generation in the circuit mounted to the circuit board 22. An infrared temperature sensor may be employed instead of the thermistor. The infrared temperature sensor may be provided at a location other than on the circuit board 22, as long as the location can receive infrared radiation from the circuit board 22.

Figure 3:
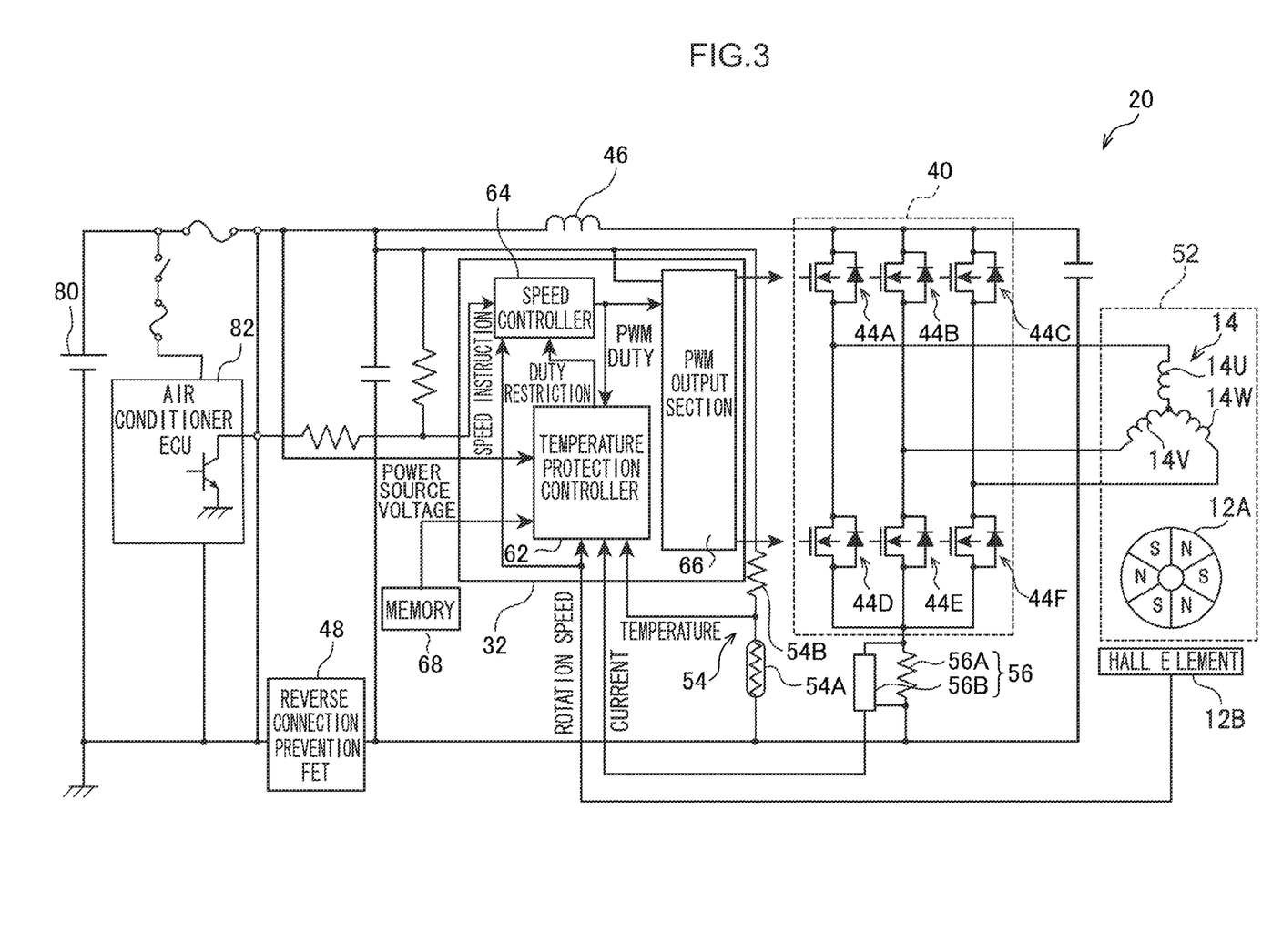
FIG. 3 is a schematic view of a motor controller according to an exemplary embodiment of the present disclosure.

FIG. 3 is a schematic view of the motor controller 20 according to the present exemplary embodiment. The inverter circuit 40 switches power supplied to the coils of the stator 14 of a motor 52. For example, the inverter FETs 44A, 44D, the inverter FETs 44B, 44E, and the inverter FETs 44C, 44F switch the power supplied to a U phase coil 14U, a V phase coil 14V, and a W phase coil 14W, respectively.

The drains of each of the inverter FETs 44A, 44B, 44C are connected to the positive electrode of an on-board battery 80 through the noise removal choke coil 46. The sources of each of the inverter FETs 44D, 44E, 44F are connected to the negative electrode of the battery 80 through the reverse connection prevention FET 48.

In the present exemplary embodiment, the magnetic field of a rotor magnet 12A, or a sensor magnet, provided coaxially to the shaft 16 is detected by a Hall element 12B. The microcomputer 32 detects the rotation speed and position (rotation position) of the rotor 12 based on the magnetic field detected by the Hall element 12B, and controls switching of the inverter circuit 40 according to the rotation speed and rotation position of the rotor 12.

A control signal, including a speed instruction value relating to the rotation speed of the rotor 12, is input to the microcomputer 32 from an air conditioner ECU 82 that controls the air conditioner according to switching operation of the air conditioner. A voltage divider circuit 54 configured by the thermistor 54A and a resistor 54B, and a current sensor 56 provided between the inverter circuit 40 and the negative electrode of the battery 80, are also connected to the microcomputer 32.

Since the resistance value of the thermistor 54A configuring the voltage divider circuit 54 varies according to the temperature of the circuit board 22 of the circuit, the voltage of signals output by the voltage divider circuit 54 varies according to the temperature of the circuit board 22. The microcomputer 32 computes the temperature of the circuit board 22 based on variations in voltage of the signals output from the voltage divider circuit 54. In the present exemplary embodiment, for ease of explanation, the signals output from the voltage divider circuit 54 are considered signals based on detection results of the thermistor 54A. Moreover, in the present exemplary embodiment, the temperature of the circuit board 22 of the circuit computed based on the detection results of the thermistor 54A is considered the temperature of the circuit board 22 of the circuit detected by the thermistor 54A.

The current sensor 56 includes, for example, a shunt resistor 56A, and an amplifier 56B that amplifies the electrical potential difference across both ends of the shunt resistor 56A. The microcomputer 32 computes the current of the inverter circuit 40 based on a signal output by the amplifier 56B.

In the present exemplary embodiment, a signal from the thermistor 54A, a signal output from the current sensor 56, and a signal output from the Hall element 12B are input to a temperature protection controller 62 inside the microcomputer 32. The temperature protection controller 62 computes the temperature of the elements on the circuit board 22, the current of the inverter circuit 40, and the rotation speed of the rotor 12, and so on, based on the respective input signals. The battery 80 is connected to the temperature protection controller 62 and serves as a power source, and the temperature protection controller 62 detects the voltage of the battery 80 as a power source voltage.

A control signal from the air conditioner ECU 82 is input to a speed controller 64 inside the microcomputer 32. The signal output from the Hall element 12B is also input to the speed controller 64. Based on the rotation speed and rotation position of the rotor 12, that are based on the control signal from the air conditioner ECU 82 and a signal from the Hall element 12B, the speed controller 64 computes a duty ratio of Pulse Width Modulation (PWM) control relating to switching control of the inverter circuit 40.

A signal indicating the duty ratio computed by the speed controller 64 is input to a PWM output section 66 and the temperature protection controller 62. Based on the temperature of the elements of the circuit board 22, the rotation speed of the rotor 12, and the circuit load of the motor controller 20, the temperature protection controller 62 corrects the duty ratio computed by the speed controller 64, and feeds this back to the speed controller 64. The circuit load is, for example, the current of the inverter circuit 40, the power source voltage, or a duty ratio of the voltage generated by the inverter circuit 40. In the present exemplary embodiment, the duty ratio of voltage generated by the inverter circuit 40 is the same as the duty ratio of voltage that the PWM output section 66 makes the inverter circuit 40 generate. As illustrated in FIG. 3, a signal indicating the duty ratio of voltage that the PWM output section 66 makes the inverter circuit 40 generate is also input to the temperature protection controller 62.

Memory 68, this being a storage device, is also connected to the temperature protection controller 62. The memory 68 stores three dimensional maps of correction values for correcting the circuit temperature detected by the thermistor 54A according to the rotation speed of the rotor 12 and the circuit load of the motor controller 20. As explained below, the temperature protection controller 62 computes the temperature of elements of the circuit by referring to the three dimensional maps stored in the memory 68.

The speed controller 64 feeds back the correction by the temperature protection controller 62 to the duty ratio computed by the speed controller 64 itself using a Proportional Integral Controller (PI Controller) or the like, and outputs a signal, indicating the duty ratio after the feedback, to the PWM output section 66. The PWM output section 66 controls switching of the inverter circuit 40 so as to generate the voltage of the duty ratio indicated by the input signal.

Figure 4:
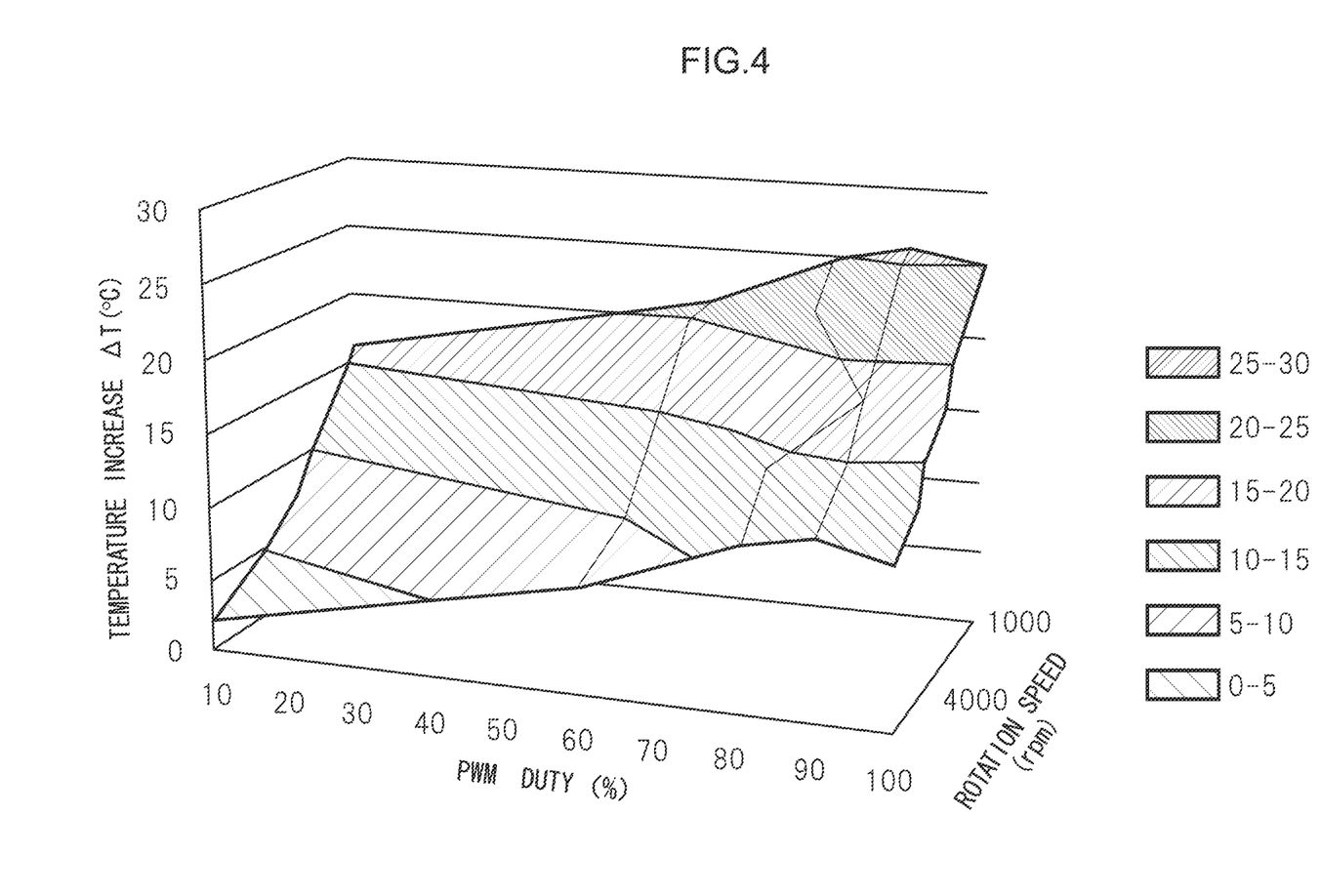
FIG. 4 is a three dimensional map illustrating an example of a temperature increase in thermistor temperature with respect to a duty ratio and a rotation speed of a rotor, in a case in which the voltage of a battery of a motor controller according to an exemplary embodiment of the present disclosure is constant (12V).

Explanation follows regarding operation and advantageous effects of the motor controller 20 according to the present exemplary embodiment. FIG. 4 is a three dimensional map illustrating an example of a temperature increase in a thermistor temperature with respect to the duty ratio and the rotation speed of the rotor 12, in a case in which the voltage of the battery 80 of the motor controller 20 according to the present exemplary embodiment is constant (12V). As illustrated in FIG. 4, the thermistor temperature, this being the temperature of the circuit board 22 detected by the thermistor 54A, increases the larger the duty ratio, and the faster the rotation speed of the rotor 12.

Figure 5:
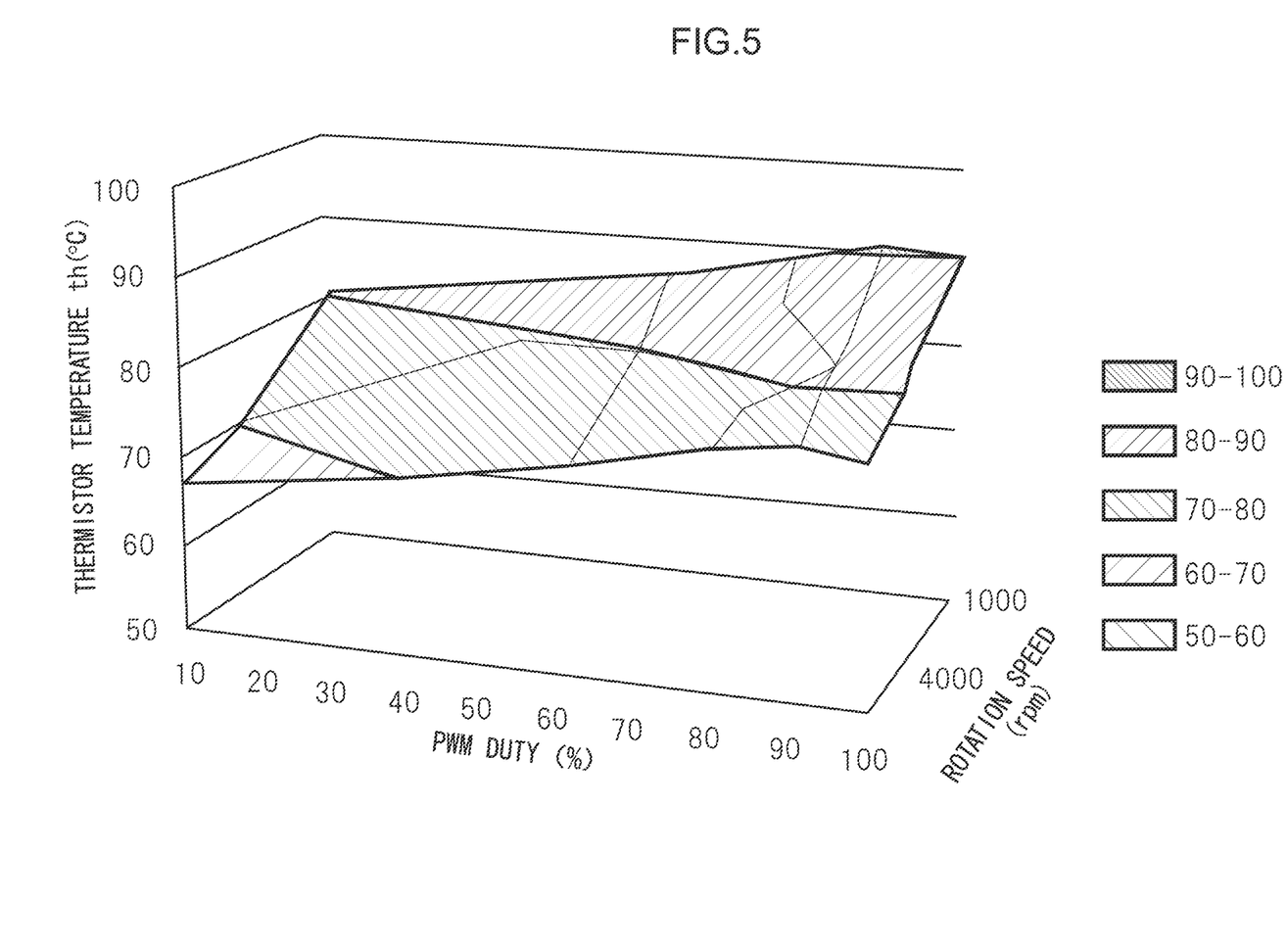
FIG. 5 is a three dimensional map illustrating an example of distribution of a thermistor temperature with respect to a duty ratio and a rotation speed of a rotor, in a case in which the voltage of a battery of a motor controller according to an exemplary embodiment of the present disclosure is constant (12V).

FIG. 5 is a three dimensional map illustrating an example of distribution of a thermistor temperature th with respect to the duty ratio and the rotation speed of the rotor 12, in a case in which the voltage of the battery 80 of the motor controller 20 according to the present exemplary embodiment is constant (12V). As illustrated in FIG. 5, in a case in which the initial temperature Ta is 65° C., the thermistor temperature th increases the larger the duty ratio, and the faster the rotation speed of the rotor 12.

Although the three dimensional maps illustrated in FIG. 4 and FIG. 5 may be approximately computed using simulation by modeling, they are determined based on data acquired from testing using the actual motor unit.

In the present exemplary embodiment, elements configuring the motor controller 20 and the motor 52 are classified as an element 1 or an element 2. An element 1 is an element that generates significant heat when there is a large current flowing from the battery 80, specifically the choke coil 46 and the coils of the stator 14. An element 2 is an element that generates significant heat when the battery 80 has a high voltage, specifically the inverter FETs 44A to 44F.

Figure 6:
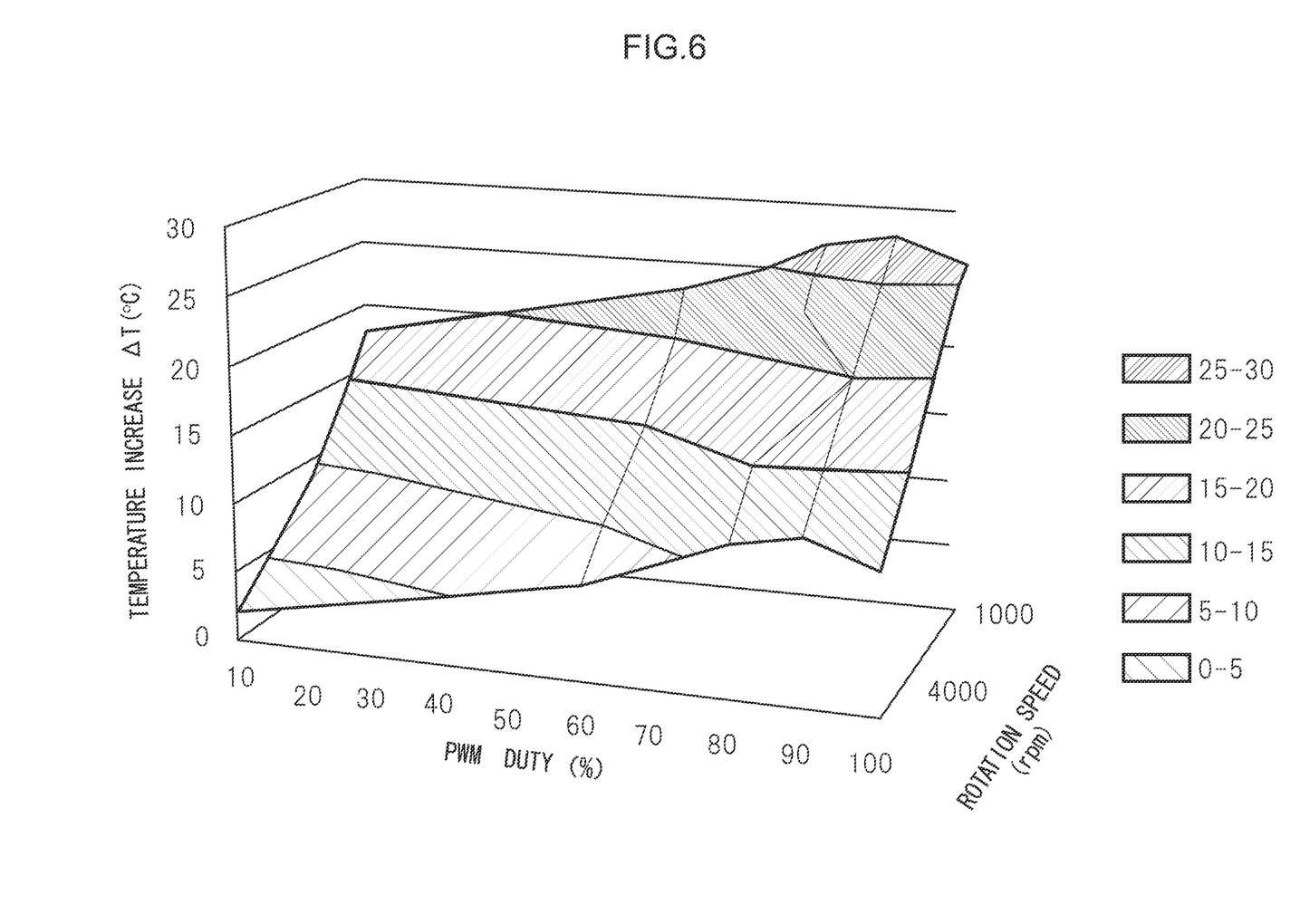
FIG. 6 is a three dimensional map illustrating an example of a temperature increase of an element 1 with respect to a duty ratio and a rotation speed of a rotor, in a case in which the voltage of a battery of a motor controller according to an exemplary embodiment of the present disclosure is constant (12V).
Figure 7:
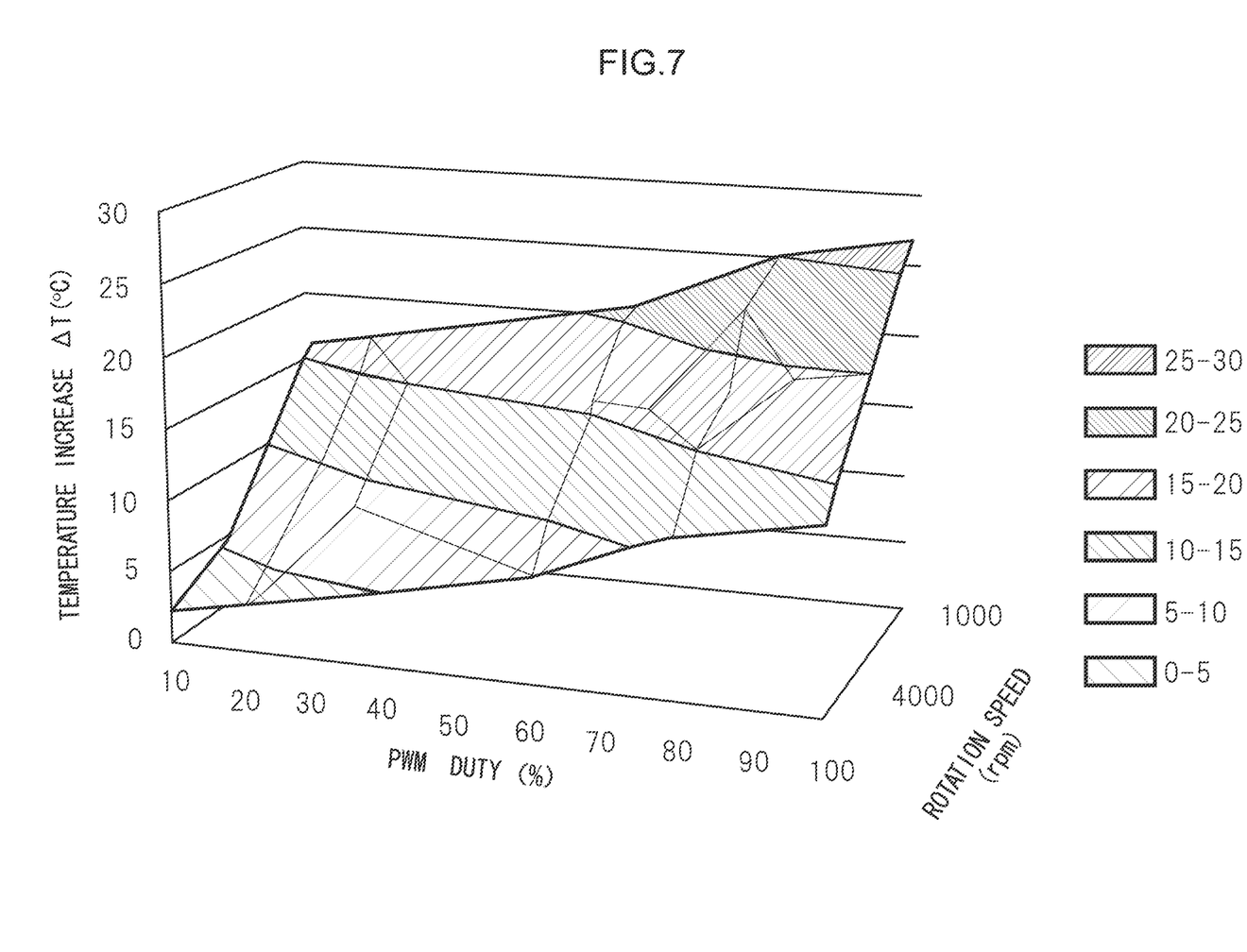
FIG. 7 is a three dimensional map illustrating an example of a temperature increase of an element 2 with respect to a duty ratio and a rotation speed of a rotor, in a case in which the voltage of a battery of a motor controller according to an exemplary embodiment of the present disclosure is constant (12V).

FIG. 6 is a three dimensional map illustrating an example of a temperature increase of an element 1 with respect to the duty ratio and the rotation speed of the rotor 12, in a case in which the voltage of the battery 80 of the motor controller 20 according to the present exemplary embodiment is constant (12V). FIG. 7 is a three dimensional map illustrating an example of a temperature increase of an element 2 with respect to the duty ratio and the rotation speed of the rotor 12, in a case in which the voltage of the battery 80 of the motor controller 20 according to the present exemplary embodiment is constant (12V).

The three dimensional maps illustrated in FIG. 6 and FIG. 7 are correction values for correcting the circuit temperature detected by the thermistor 54A according to the rotation speed of the rotor 12 and the circuit load. Although the three dimensional maps illustrated in FIG. 6 and FIG. 7 may be approximately computed using simulation by modeling, they are determined based on data acquired from testing using the actual motor unit, and stored in the memory 68.

In the present exemplary embodiment, the temperature of the element 1 or the element 2 when the voltage is constant is computed by adding the temperature increase value according the duty ratio and the rotation speed of the rotor 12 in FIG. 6 or FIG. 7, to the thermistor temperature th illustrated in FIG. 5. Specifically, respective computations are made by using FIG. 6 for the element 1, and FIG. 7 for the element 2, to derive the temperature increase according to the duty ratio and the rotation speed of the rotor 12, and adding this to the thermistor temperature th detected by the thermistor 54A.

For example, in a case in which the duty ratio is 50% and the rotation speed is 4000 rpm, the temperature increase of the element 1 in FIG. 6 is 13° C. When the thermistor temperature th is 75° C. and the battery voltage is 12V, the temperature of the element 1 is therefore 88° C.

The above computation of the temperature of the element 1 from the three dimensional map and the thermistor temperature th actually measured by the thermistor 54A is for a case in which the voltage is constant (12V). In the present exemplary embodiment, the temperatures of the elements 1, 2 computed from the three dimensional maps in FIGS. 6, 7 and the thermistor temperature th actually measured by the thermistor 54A is corrected according to the power source voltage, this being the voltage of the battery 80.

In the three dimensional maps illustrated in FIG. 6 and FIG. 7, the circuit load is considered the duty ratio of voltage generated by the inverter circuit 40; however the circuit load may be considered a current value of the inverter circuit 40 detected by the current sensor 56. In cases in which the circuit load is considered the current value of the inverter circuit 40 in the three dimensional maps, the temperature increase is also determined according to current values and rotation speeds based on data acquired by testing using the actual motor unit, and stored in the memory 68.

Figure 8:
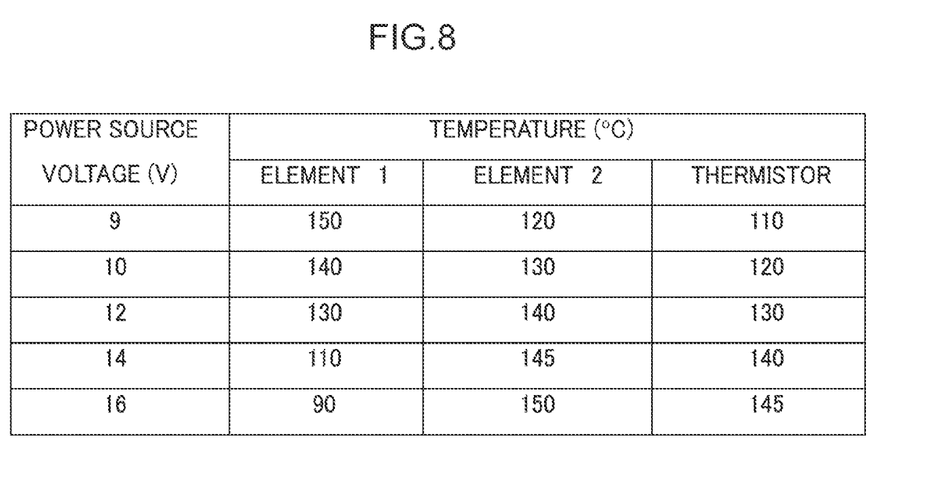
FIG. 8 is a table illustrating an example of temperatures of an element 1, temperatures of an element 2, and thermistor temperatures, in a motor controller according to an exemplary embodiment of the present disclosure, classified according to power source voltage.

FIG. 8 is a table indicating an example of the temperatures of the element 1, the temperatures of the element 2, and the thermistor temperatures th in the motor controller 20 according to the present exemplary embodiment, classified according to the power source voltage. Each of the values indicated in FIG. 8 depends on the configuration of the motor controller 20, and so is determined through testing using the actual motor unit.

Figure 9:
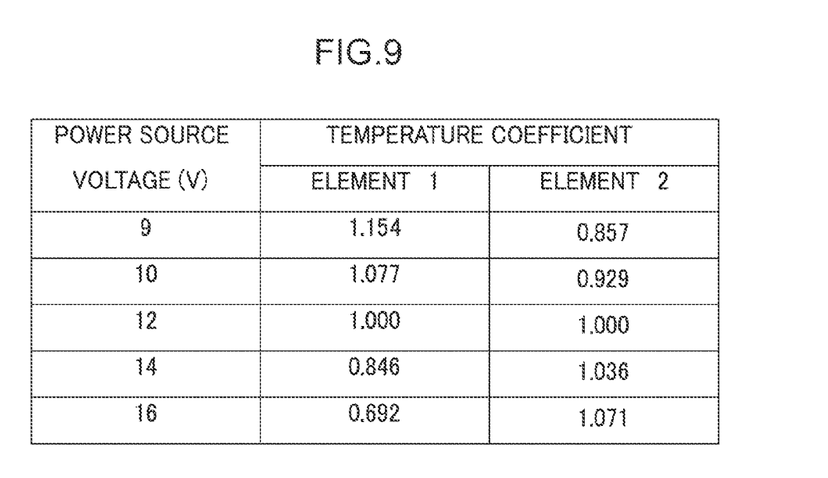
FIG. 9 is a table illustrating an example of temperature coefficients of elements 1, 2 of a motor controller according to an exemplary embodiment of the present disclosure.

FIG. 9 is a table indicating an example of temperature coefficients of the elements 1, 2 of the motor controller 20 according to the present exemplary embodiment. FIG. 9 is based on the temperature variations of each element due to the voltage indicated in FIG. 8. When the power source voltage is 12V, the temperature coefficient is 1.000. In the present exemplary embodiment, the temperature coefficient corresponding to the power source voltage is derived from FIG. 9, and the derived temperature coefficient is multiplied by the temperatures of the elements 1, 2 computed from the three dimensional maps in FIGS. 6, 7 and the thermistor temperature th actually measured by the thermistor 54A, to compute the temperatures of the elements 1, 2 according to the duty ratio, the rotation speed, and the power source voltage.

For example, if the power source voltage is supposed to be 12V when the duty ratio computed as described above is 50% and the rotation speed is 4000 rpm, in a case in which the actual power source voltage is for example 10V, since the temperature of the temperature coefficient in FIG. 9 is 1.077, the temperature of the element 1 (88° C.) is computed as below.

$$88 \times 1.077 = 94.78(° C.) \quad (1)$$

In the present exemplary embodiment, in cases in which either of the temperatures of the elements 1, 2 computed using equation (1) above is a specific threshold value or above, the duty ratio is reduced to reduce the load of the motor 52 and the motor controller 20, thereby reducing the temperatures of the elements 1, 2.

Figure 10:
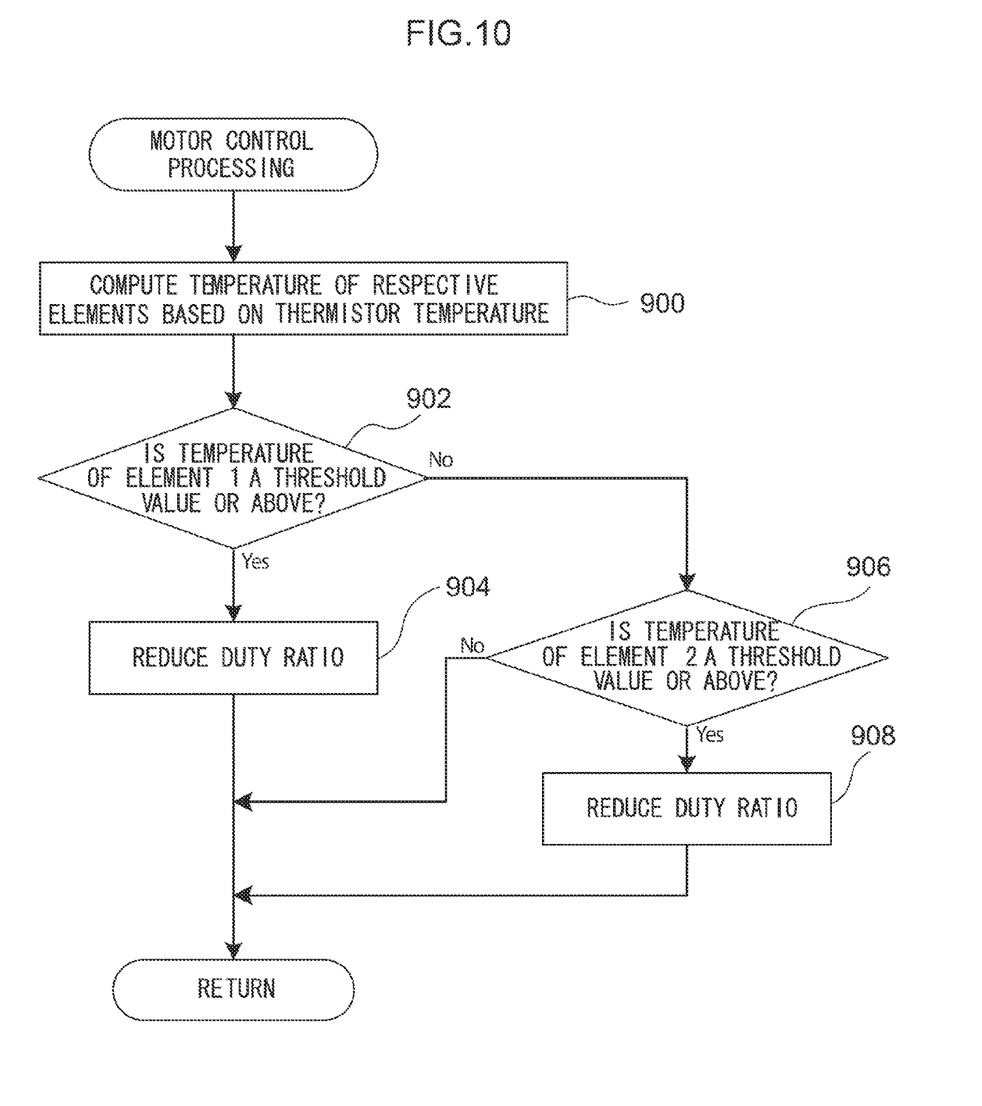
FIG. 10 is a flowchart illustrating an example of motor control processing by a motor controller according to an exemplary embodiment of the present disclosure.

FIG. 10 is a flowchart illustrating an example of motor control processing by the motor controller 20 according to the present exemplary embodiment. At step 900, the temperatures of the elements 1, 2 are computed based on the thermistor temperature th, as described above.

At step 902, determination is made whether or not the temperature of the element 1 is a predetermined threshold value or above. The predetermined threshold value depends on the heat resistance of the mounted element, and is set at 140° C. in the present exemplary embodiment as an example. In cases of affirmative determination at step 902, at step 904, the duty ratio is reduced and processing is repeated.

In cases of negative determination at step 902, at step 906, determination is made whether or not the temperature of the element 2 is a predetermined threshold value or above. The specific threshold value depends on the heat resistance of the mounted element, and is set at 145° C. in the present exemplary embodiment as an example. In cases of affirmative determination at step 906, at step 908, the duty ratio is reduced and processing returns. In cases of negative determination at step 906, processing is returned without reducing the duty ratio.

Note that the proportion by which the duty ratio is reduced at steps 904, 908 depends on the specification of the motor 52 and the motor controller 20, and this proportion is set to 20% in the present exemplary embodiment.

As explained above, in the present exemplary embodiment the temperature of respective elements can be computed by correcting the thermistor temperature th according to the characteristics of the elements 1, 2, and the power source voltage. A risk of overheating of the elements is detected based on the computed temperature of the respective elements, enabling overheating of the elements to be suppressed.

What is claimed is:

1. A motor controller comprising:
  a voltage generator that generates a voltage to drive a motor using current supplied from a power source;
  a temperature detector that detects a temperature of a circuit including the voltage generator;
  a rotation speed detector that detects a rotation speed of the motor;
  a storage section that stores first correction values for each of a plurality of elements configuring the circuit, the first correction values corresponding to (i) the rotation speed of the motor, and (ii) a load of the circuit, and
  a voltage controller that controls the voltage generator, wherein the voltage controller performs the following:
  computing first corrected temperatures for each of the plurality of elements by correcting the temperature of a circuit detected at the temperature detector using the first correction values;
  determining whether or not the first corrected temperatures exceed predetermined threshold values for each of the plurality of elements; and
  having the voltage generator decrease the voltage, if the result of the determination is positive.

2. The motor controller of claim 1, wherein the load of the circuit is the duty ratio of a PWM signal to control switching of the voltage generator.

3. The motor controller of claim 1, further comprising:
  a current detector that detects the current supplied from the power source; and wherein
  the load of the circuit is the current.

4. The motor controller of claim 1, wherein:
  the plurality of elements include a first element that has a high temperature when the current is large, and a second element that has a high temperature when the voltage of the power source is large.

5. The motor controller of claim 1, wherein
  the storage section further stores second correction values for each of the plurality of elements configuring the circuit, the second correction values corresponding to the voltage of the power source, and
  the voltage controller performs the following:
  computing second corrected temperatures for each of the plurality of elements by correcting the first corrected temperatures using the second correction values; and
  executing the determination using the second corrected temperatures instead of the first corrected temperatures.

* * * * *